March 12, 1957 F. W. DEL BUSTO 2,785,234

SHOULDER SUPPORTED HOLDER FOR TELEPHONES

Filed Jan. 31, 1956

INVENTOR.
FELIPE WENSELL del BUSTO
BY
McMorrow, Berman & Davidson
ATTORNEYS

United States Patent Office 2,785,234

Patented Mar. 12, 1957

2,785,234

SHOULDER SUPPORTED HOLDER FOR TELEPHONES

Felipe Wensell del Busto, Madrid, Spain

Application January 31, 1956, Serial No. 562,569

3 Claims. (Cl. 179—157)

This invention relates to telephone holders or supports, and more particularly has reference to a device of the type stated which is adapted to support a so-called "French" phone, that is a telephone having a combination transmitter-receiver, in position for use upon the shoulder of the user.

The purpose of a holder of the type referred to is, of course, to permit use of both hands by the user, during the telephone conversations, and further, is adapted to prevent one from tiring by reason of the necessity of holding the instrument to the ear and mouth, during long conversations.

The main object of the present invention is to provide a generally improved device of the type referred to.

As a more specific object it is proposed to provide a device as stated which will be particularly adapted for supporting the telephone in proper position for use.

Another object of importance is to provide a device as stated in which the position of the supported instrument can be adjusted as desired.

Yet another object is to provide a holder in which the shoulder-engaging means is readily adjustable to fit comfortably over the shoulder of the particular user.

Still another object is to provide a device as stated in which the telephone will be engaged by a pivoted block, with the element on which said block is pivoted being in turn mounted upon a shoulder-straddling frame, and being adjustable longitudinally of the frame, that is, along lines substantially normal to the pivot axis of the supported instrument.

Still another object is to provide a device as stated which will not require modification or redesign of the telephone instrument, will not be objectionable as a so-called "foreign attachment" so far as the telephone companies are concerned, and can be manufactured at relatively low cost.

Other objects and advantages will become apparent from a consideration of the following description and the appended claims in conjunction with the accompanying drawings, wherein:

Figure 4:
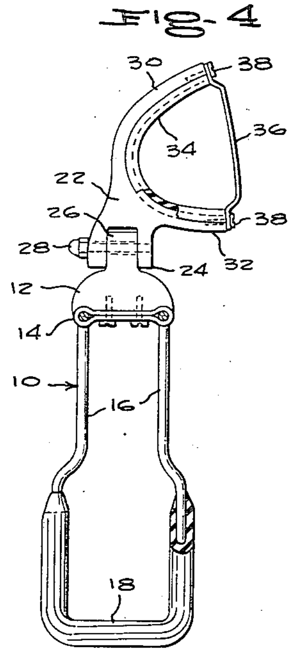
Figure 4 is a transverse sectional view on line 4—4 of Figure 2.

Designated generally at 10 is the telephone support device constituting the present invention, including a block 12 formed of hard rubber, plastic, or the like, to the underside of which is secured a length of flat metal material shaped as shown in Figure 4 to include transversely spaced, parallel loops 14 receiving the legs 16 of a frame designated at 18. The frame 18 is of substantially U-shape, including a bight integrally connected at its opposite ends to the respective legs 16. The legs 16 are elongated, and the portions of the legs connected to the bight are spaced apart a greater distance than the intermediate portions of the legs.

At their free ends, the legs are provided with axially recessed longitudinal extensions 20, formed of rubber material to provide a better grip of the device upon the shoulder of a user. The bight end of the frame is also rubber coated, having a sleeve of U-shape, said sleeve having its intermediate portion covering the bight of the frame, and having end portions covering the outwardly offset inner ends of legs 16, for substantially the full lengths of the offset parts of the legs.

Figure 2:
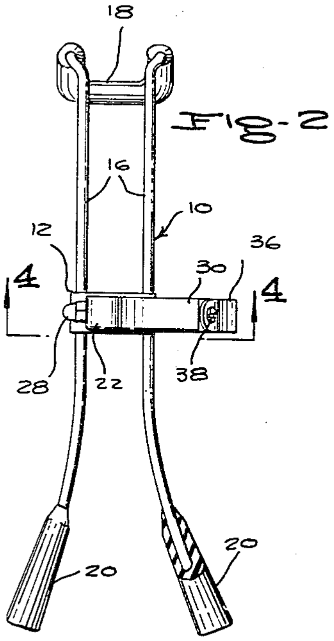
Figure 2 is a front elevational view of the device on an enlarged scale, a portion being shown in section.

The intermediate portions of the legs are extended in parallel relation, as shown in Figure 2, while the free end portions of the legs, having at their extremities the rubber extensions, diverge along curving lines in the direction of said extremities. This, it has been found, produces a particularly desirable action as regards fitting of the device to the shoulder and clamping of the frame over the shoulder.

The parallel intermediate portions of the legs extend through the guide loops carried by the block 12, and the screws that secure the loop-defining metal strap to the underside of said block can be loosened for the purpose of loosening the engagement of the legs 16 within the loops. This permits adjustment of the block along the lengths of the intermediate portions of the legs, to whatever position is found most comfortable to the particular user.

Figure 3:
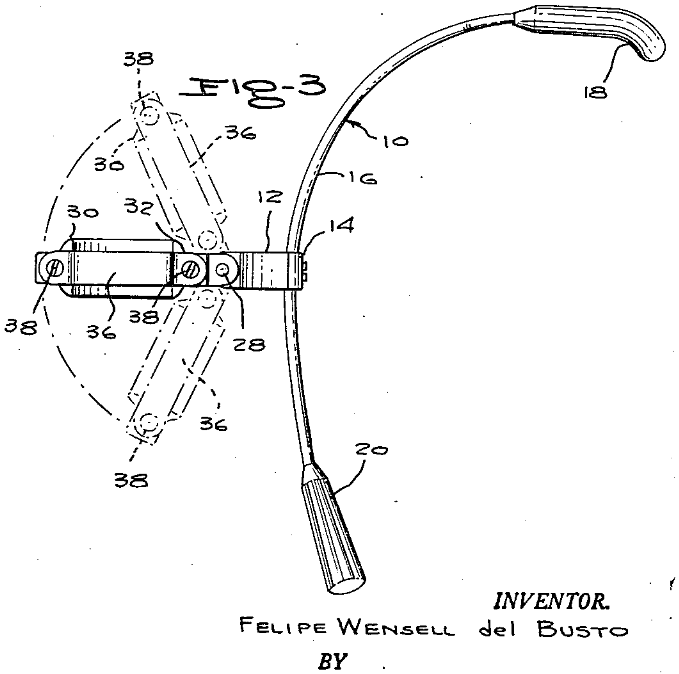
Figure 3 is a side elevational view of the device as seen from the right of Figure 2, the dotted lines showing different positions to which the instrument clamp can be pivotally adjusted.

As shown in Figure 3, when the frame is viewed in side elevation it is curved over the full length thereof, and the bight portion of the frame is angularly disposed in respect to the adjacent, parallel, outwardly offset parts of legs 16. This causes the bight of the frame to exert a pressure inwardly against the back of the user, further assuring that the device will be held against slippage from the shoulder.

A clamp member 22, formed of molded plastic, hard rubber, or the like, has transverely spaced ears 24 between which extends a tongue 26 formed upon the block 12. The tongue and ears are formed with transversely aligned openings, receiving a pivot and clamping bolt 28, and thus, the clamp 22 can be adjusted pivotally about the axis of bolt 28, as for example, to any of the three positions shown in full and dotted lines respectively in Figure 2. After the device has been adjusted according to the desires of the particular user, it is held in selected positions of adjustment by a tightening of the nut with which the clamping screw is provided.

At the end of the clamping member remote from the pivotal connection thereof to block 12, fork arms 30, 32 are formed, adapted to receive between them a telephone instrument A. To prevent damage to the instrument and to assure a proper gripping of the same, the fork arms have their inner surfaces covered by a liner 34 of soft rubber or the like. After the instrument has been placed between the fork arms, a cross bar 36, having an outwardly offset intermediate portion, is secured to the extremities of the fork arms by means of screws 38 threaded into longitudinal recesses provided in the respective fork arms.

As illustrated in Figure 4, the fork arms project laterally in one direction from the clamp member 22, so that the fork arms are in effect disposed beyond one side of the elongated, curved, U-shaped frame. Further, it will be noted that the clamp member support block 12, and hence the clamp member and the supported instrument, are adjustable along the length of the frame, along a curved path, with the pivot axis of the clamp member being disposed crosswise of the path of slidable adjustment of block 12 upon the frame.

Figure 1:
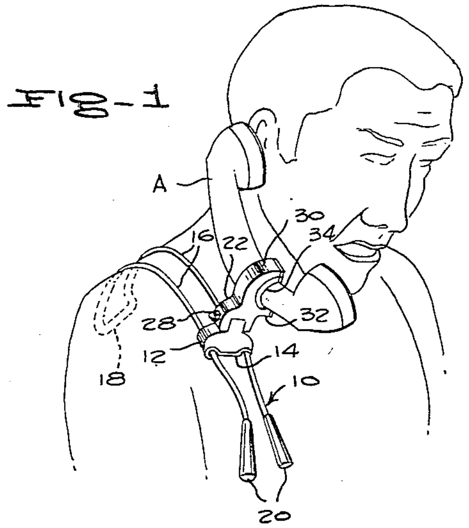
Figure 1 is a perspective view of a device formed according to the present invention, as it appears when in use.

The net result achieved by the construction illustrated and described is to facilitate the supporting of the instrument where it will be most comfortable so far as the person using the telephone the most is concerned. Further, it will be understood that the frame, when the telephone is seated in its cradle, not shown, will be disposed clear of the cradle, so as not to require modification or redesign of the instrument A or the associated cradle in any way. At such time as the phone is to be used, merely picking up the phone and disposing it in its natural position for conversation causes the frame to be disposed in straddling relation to the shoulder of the wearer, in the position shown in Figure 1. When the frame is so disposed, the rubber extensions 20 and the rubber sleeve coating the bight are engaged against the front and back of the wearer, adjacent the shoulder, and provide a light yet sure grip upon the wearer's garments, to hold the device against slippage.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A device for supporting a transmitter-receiver of a telephone in position for use comprising an elongated, U-shaped, bendable frame including a pair of legs adapted to fit over the shoulder of a user; a block mounted upon the legs of said frame for adjustment longitudinally of said legs; means for clamping the block to the legs in selected positions of adjustment of the block; a clamp member pivotally mounted upon the block for adjustment about an axis extending transversely of the legs; and means for retaining the clamp member in selected positions to which it is pivotally adjusted.

2. A device for supporting a transmitter-receiver of a telephone in position for use comprising an elongated, U-shaped, bendable frame including a pair of legs adapted to fit over the shoulder of a user; a block mounted upon the legs of said frame for adjustment longitudinally of said legs; means for clamping the block to the legs in selected positions of adjustment of the block; a clamp member pivotally mounted upon the block for adjustment about an axis extending transversely of the legs; and means for retaining the clamp member in selected positions to which it is pivotally adjusted, said clamp member including fork arms projecting laterally in one direction in respect to the frame, a soft resilient liner overlying the inner surface of the fork arms, and a cross bar connected between the fork arms to engage the transmitter-receiver against said liner.

3. A device for supporting a transmitter-receiver of a telephone in position for use comprising an elongated, longitudinally curved frame formed from a length of bendable rod material having a U-shape, the frame including a bight, and legs extending from the bight, said legs having outwardly offset portions adjacent the bight, parallel, intermediate portions adapted to curve over the shoulder of a user, and divergent free end portions, the bight and free end portions having a soft, resilient covering adapted to grip the front and back of the wearer; a block mounted upon said legs for adjustment longitudinally of the intermediate portions; and a clamp member mounted upon said block for pivotal adjustment about an axis extending transversely of the legs, said clamp member including fork arms projecting laterally in one direction with respect to the block and frame, a soft, resilient covering overlying the inner surfaces of the fork arms, and a cross bar connected between the free ends of the fork arms and adapted to engage a transmitter-receiver against the covering of the fork arms.

References Cited in the file of this patent

UNITED STATES PATENTS

| | | |
|---|---|---|
| 2,348,138 | Latus et al. | May 2, 1946 |
| 2,640,111 | Samsky et al. | May 26, 1953 |
| 2,644,043 | Zakos | June 30, 1953 |